Feb. 8, 1949.                S. R. OURS                 2,460,843
                      AIRPLANE FLIGHT SAFETY DEVICE
                          Filed March 26, 1946
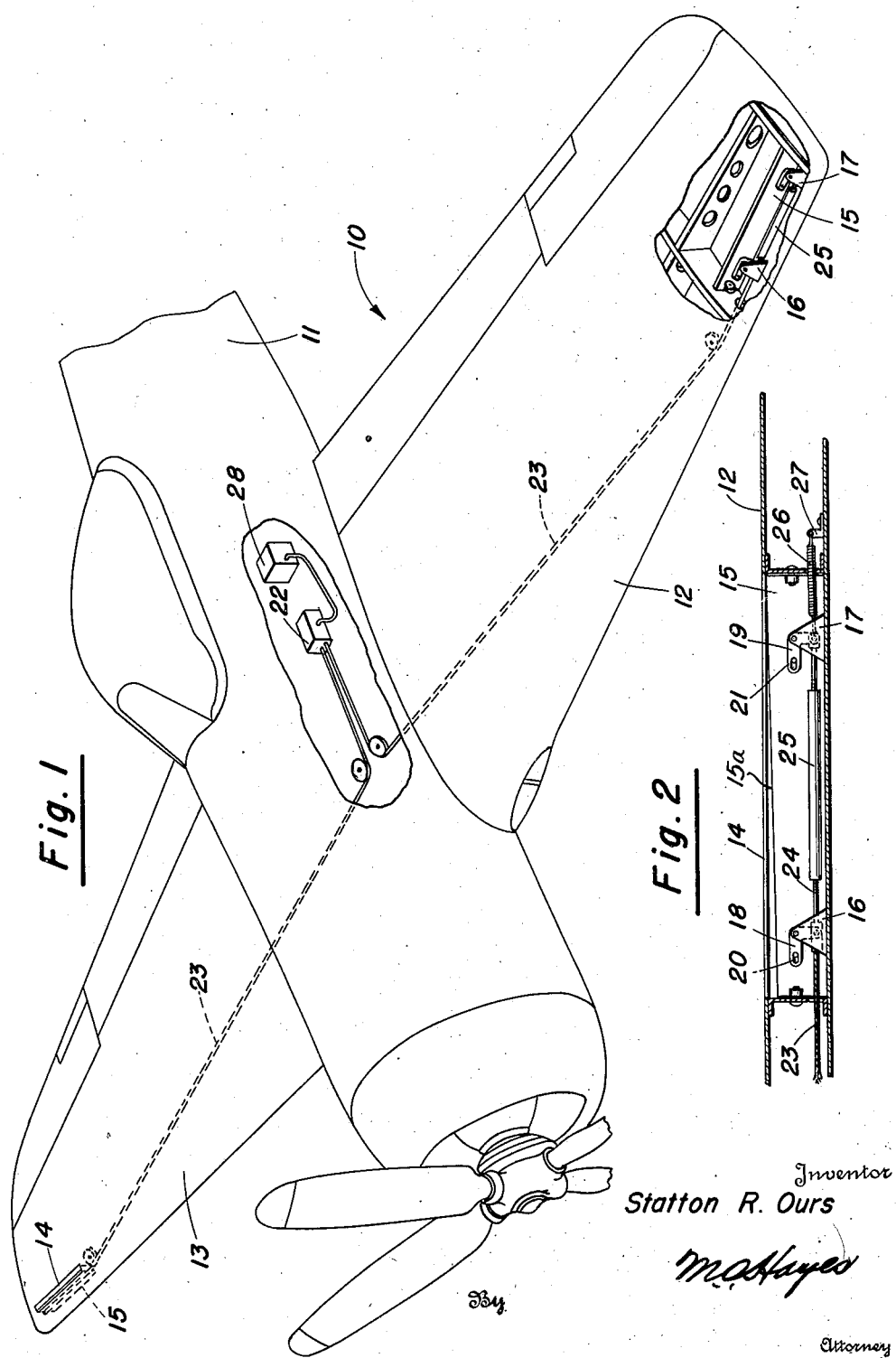
Inventor
Statton R. Ours
By M. O. Hayes
Attorney Patented Feb. 8, 1949

2,460,843

UNITED STATES PATENT OFFICE 2,460,843

AIRPLANE FLIGHT SAFETY DEVICE

Statton R. Ours, United States Navy

Application March 26, 1946, Serial No. 657,316

5 Claims. (Cl. 244—113)

(Granted under the act of March 3, 1883, as amended April 30, 1928; 370 O. G. 757)

This invention relates to aircraft safety devices and more particularly to safety devices for preventing breakage of aircraft wings, as may occur on overloading of the wings.

Aircraft wings are designed to sustain predetermined maximum loads, permissive loads on wings being somewhat less than the ultimate strength of the wing to allow for appropriate factors of safety. Load on the wings of a plane in flight, or the lift, includes the weight of the plane plus forces introduced by movements of the plane. These latter forces may become excessive in certain maneuvers of the plane and thereby load the wings beyond their ultimate strength. As a safety precaution, wings may be designed to break near the tips when overloads occur, rather than adjacent the fuselage, thus leaving intact a sufficient wing area to permit the plane to land. However, such a safety means has the disadvantage of being operable for only one overload without making it necessary to replace the broken wing.

Objects of the present invention are to provide improved safety devices for automatically cutting down loads on aircraft wings when such loads exceed maximum permissive loads; to provide improved safety devices of the character referred to capable of repeatedly cutting down excessive wing loads without the necessity of breaking any portion of the wing; to provide improved safety devices of simple and rugged construction, light weight, and automatic in operation; and to provide improved safety devices of the character described and for the purposes set forth.

In accomplishing these and other objects of the present invention, I have provided improved details of structure, a preferred form of which is illustrated in the accompanying drawing, wherein:

Fig. 1 is a perspective view of an aircraft having a safety device embodying the features of the present invention installed thereon; and Fig. 2 is a front elevational view of a portion of the safety device shown in Fig. 1.

Referring more in detail to the drawing:

In Fig. 1 there is shown at 10 an aircraft which may be of any conventional design and includes a fuselage 11 and wings 12 and 13. The upper surfaces of the wings contain slots 14 extending in substantially spanwise directions from adjacent the wing tips.

An elongated "spoiler" member 15 with sloping surface 15a is mounted within each wing in position to be projected above the wing surface through the slot 14. Preferably the mounting means comprises a pair of inwardly extending lugs 16 and 17 fixed to the upper face of the lower skin of the wing and a pair of bell-cranks 18 and 19 pivoted at their mid-portions to said lugs (Fig. 2). Arms of the bell-cranks are pivoted to the spoiler member 15, as indicated at 20 and 21.

The spoiler members are adapted to move between a retracted or inoperative position, in which they are housed within the wings, and an extended or operative position, in which they project above the wing surfaces through the slots 14. In the latter position the spoiler members destroy or materially reduce the lift of the wings in the region of the tips, thereby reducing the bending moment and the shear on the wings.

The specific arrangement and design of the spoiler members is obviously subject to wide variation without departing from the present invention. It is obvious for example, that spoiler members could be arranged to project downwardly from the wing, as well as upwardly, or that the upper edge of said members could be flat or sloping or otherwise shaped as desired. A tapering or sloping spoiler member as illustrated in Fig. 2 operates to spoil the lift at the outer tips of the wing first, and as it is progressively projected above the wing surface the spoiling effect is extended toward the wing root.

Means are provided for automatically moving the spoiler members on each wing to their extended positions whenever the forces on the wings exceed a predetermined value, normally the permissive maximum load, and for automatically retracting said members when the force on the wings is reduced below the predetermined value.

An operating device 22 for effecting projection of the spoilers is suitably mounted within the body of the aircraft. The operating device may be any well known mechanism for effecting limited movement, as, for example, an electric solenoid or a hydraulic motor. The construction of the operating device per se does not form a part of the present invention and hence is not shown in detail.

The free arms of each pair of bell-cranks 18 and 19 are operatively connected with the operating device 22 by means of cables 23 and tie rods 24. Preferably the latter include turnbuckles 25 to enable the relative position of the bell-cranks to be adjusted. A tension spring 26 is connected to each of the outboard ends of the tie rods 24 and to suitable lugs 27 fixed to the interior of the wings. The springs urge the tie rods and cables in an outboard direction, and hence normally retain the spoiler members in retracted position within the wings.

An actuating device 28 is provided for automatically actuating the operating means whenever the force on the wings is excessive. The actuating device may conveniently be either an accelerometer of known design, located at the center of gravity of the aircraft, or strain gauges of known design located at the critical sections of the wings, or a Mach meter of known design, or a combination of the three. The construction of the actuating device per se does not form a part of the present invention and hence is not shown in detail.

The operation of an aircraft safety device constructed as described is as follows:

Whenever the force on the wings of the aircraft exceeds the permissive force, as, for example, when the aircraft makes a sharp turn or pulls out of a dive too abruptly, the actuating device 28 actuates the operating device 22. The latter applies a tensile force to the cables 23 and thus rotates the bell-cranks 18 and 19 to move the spoiler members 15 to extended position through the slots 14 against the force of the springs 26.

In extended position the spoiler members are an obstruction on the wing surfaces and function to eliminate or materially reduce the lift in the portion of the wings they occupy, that is, in the region of the wing tips. Loss of lift on that portion of the wings reduces the shear and bending moment on the wings and therby reduces strain and protects the wings against breakage.

The loss of lift serves also to decelerate the aircraft. Such deceleration or decrease in strain in the wing causes the actuating device 28 to de-actuate the operating device 22 and thereby release the force on the cables 23. The tension springs 26 then retract the spoiler members within the wings to their inoperative positions.

While I have shown but one embodiment of the present invention, it is obvious that the device is subject to modification without departing from the spirit of the invention. Therefore, I do not wish to be limited by the disclosure set forth, but only by the scope of the appended claims.

The invention described herein may be manufactured and used by or for the Government of the United States of America for governmental purposes without the payment of any royalties thereon or therefor.

What is claimed is:

1. In an aircraft, a safety device including a tapering member elongated in the direction of the span of a wing of the aircraft, means mounting said tapering member in the wing adjacent the tip for movement between retracted and extended positions, said tapering member in retracted position being housed within the wing and in extended position projecting from the wing surface to reduce the lift of the wing, said tapering member adapted to reduce the lift of the wing progressively from wing tip to wing root as projected, means mounted within the aircraft and operatively connected with said mounting means for moving said member between retracted and extended positions, and means mounted within the aircraft for actuating said second named means when load on the wing exceeds a predetermined value.

2. In an aircraft, a safety device including a tapering member mounted in a wing of the aircraft adjacent the tip for movement between retracted and extended positions, said tapering member in retracted position being housed within the wing and in extended position projecting from the wing surface to reduce the lift of that portion of the wing, means mounted within the aircraft and operatively connected with said tapering member for moving said tapering member between retracted and extended positions, and means mounted within the aircraft for actuating said first named means when load on the wing exceeds a predetermined value whereby said load on the wing tip is progressively reduced from the wing tip toward the wing root as said tapering member is projected from the wing surface.

3. In an aircraft, a safety device including means mounted in the wing of the aircraft adjacent the tip for movement between retracted and extended positions, said means adapted to extend first near the wing tip and progressively toward the wing root and to reduce the lift progressively therealong during the movement of extension, and means mounted within the aircraft for moving said first named means to extended positions when load on the wing exceeds a predetermined value.

4. In an aircraft, a safety device including lineally varying means mounted in a portion of the wing of the aircraft for movement between inoperative and operative positions, and means for moving said first named means to operative position when load on the wing exceeds a predetermined value whereby the reduction of lift at any point in said portion of the wing is a function of the movement of said first named means from inoperative to operative positions.

5. In an aircraft, a safety device including lineally varying means mounted in the wings of the aircraft adjacent the tips thereof for movement between retracted and extended positions, and means mounted within the aircraft and operatively connected with said first named means for moving said first named means to extended position when load on the wings exceeds a predetermined value whereby the lift of the wings is reduced progressively from the wing tip toward the wing root as said first named means is moved from inoperative to operative positions.

STATTON R. OURS.

REFERENCES CITED

The following references are of record in the file of this patent:

UNITED STATES PATENTS

| Number | Name | Date |
| --- | --- | --- |
| 2,222,886 | Voigt | Nov. 26, 1940 |
| 2,357,680 | Molloy | Sept. 5, 1944 |
| 2,396,321 | Goddard | Mar. 12, 1946 |

FOREIGN PATENTS

| Number | Country | Date |
| --- | --- | --- |
| 507,103 | Great Britain | June 9, 1939 |